United States Patent
Rice et al.

[11] Patent Number: 5,934,112
[45] Date of Patent: Aug. 10, 1999

[54] LOCKING GUN RACK SYSTEM

[76] Inventors: David Rice, 3920 Dorset Ct., Casper, Wyo. 82609; Ronald George, 209 Boxelder Tr., Glenrock, Wyo. 82637

[21] Appl. No.: 08/955,728

[22] Filed: Oct. 22, 1997

[51] Int. Cl.[6] .................................................... B60R 7/14
[52] U.S. Cl. ........................ 70/18; 70/19; 70/58; 70/62; 211/8; 211/64; 224/913; 248/551
[58] Field of Search .................... 70/16, 18, 19, 70/59–62, 58; 211/4, 5, 8, 64; 248/551; 224/569, 912, 913

[56] References Cited

U.S. PATENT DOCUMENTS

| | | | |
|---|---|---|---|
| 739,180 | 9/1903 | Holl | 70/62 |
| 820,191 | 5/1906 | Heberling | 70/59 X |
| 1,021,343 | 3/1912 | Tingley | 70/60 X |
| 1,156,739 | 10/1915 | Backus | 70/60 X |
| 1,447,374 | 3/1923 | Bowzer | 70/60 X |
| 1,548,584 | 8/1925 | Dietrich | 70/60 X |
| 2,668,645 | 2/1954 | Pease | 70/62 X |
| 3,326,385 | 6/1967 | Pinkerton et al. | 211/64 X |
| 3,643,811 | 2/1972 | Howerton | 211/64 |
| 4,509,346 | 4/1985 | Szczepanek | 70/16 |
| 4,949,559 | 8/1990 | Glines | 70/19 |
| 5,472,101 | 12/1995 | Ahrens | 70/18 X |
| 5,676,257 | 10/1997 | Adkins | 211/64 X |

FOREIGN PATENT DOCUMENTS

| | | | |
|---|---|---|---|
| 388400 | 8/1908 | France | 70/59 |
| 588127 | 11/1933 | Germany | 70/59 |

*Primary Examiner*—Lloyd A. Gall
*Attorney, Agent, or Firm*—Dean P. Edmundson

[57] ABSTRACT

A locking gun rack system is described for securing a gun to any desired structure (e.g. a wall, cabinet, vehicle, etc.). The system includes a pair of gun supports in which an arm is pivotable between open and closed positions relative to a base, and the arm can be latched in a number of different positions so as to accommodate guns of different shapes or sizes.

8 Claims, 9 Drawing Sheets

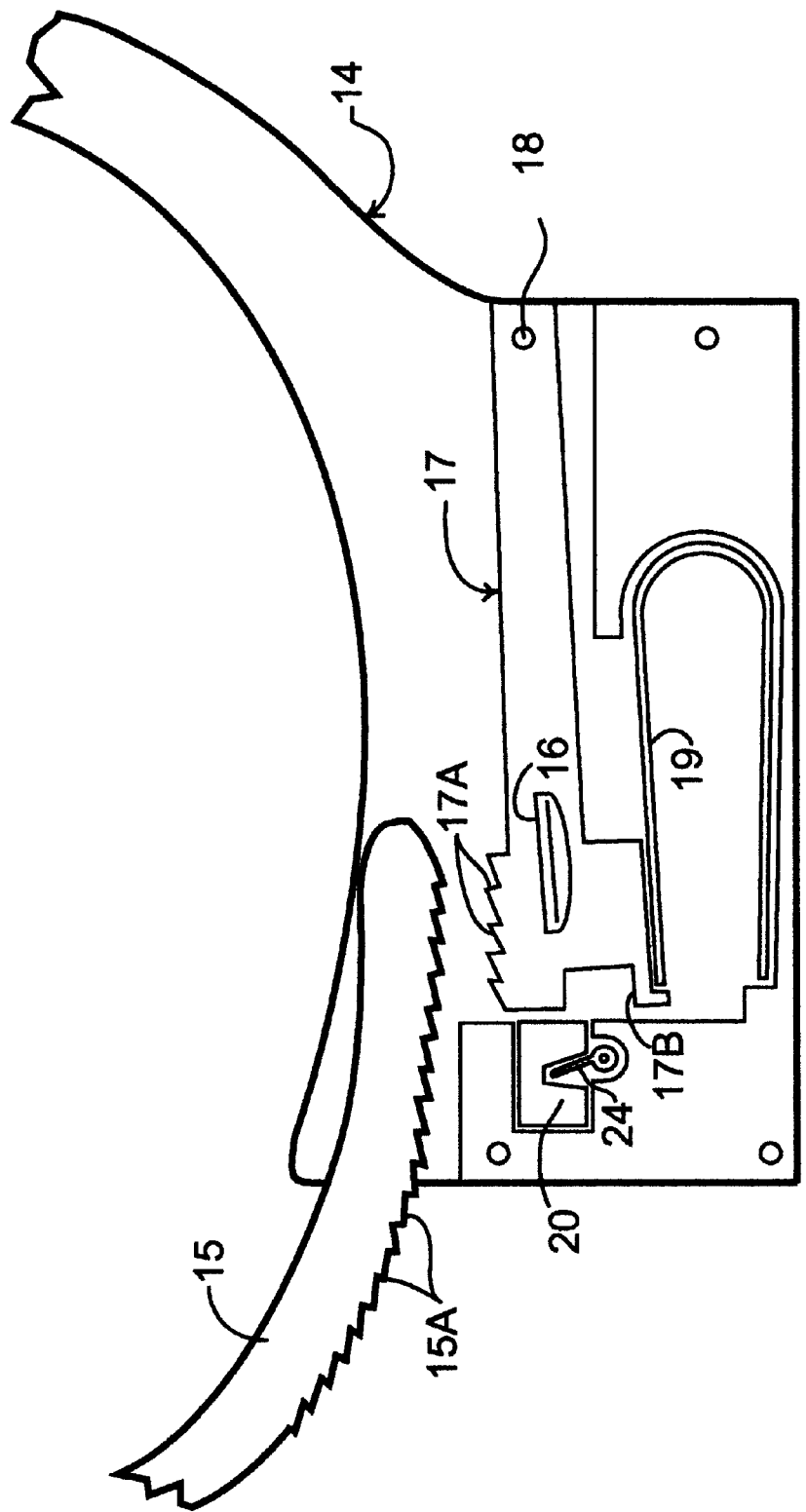

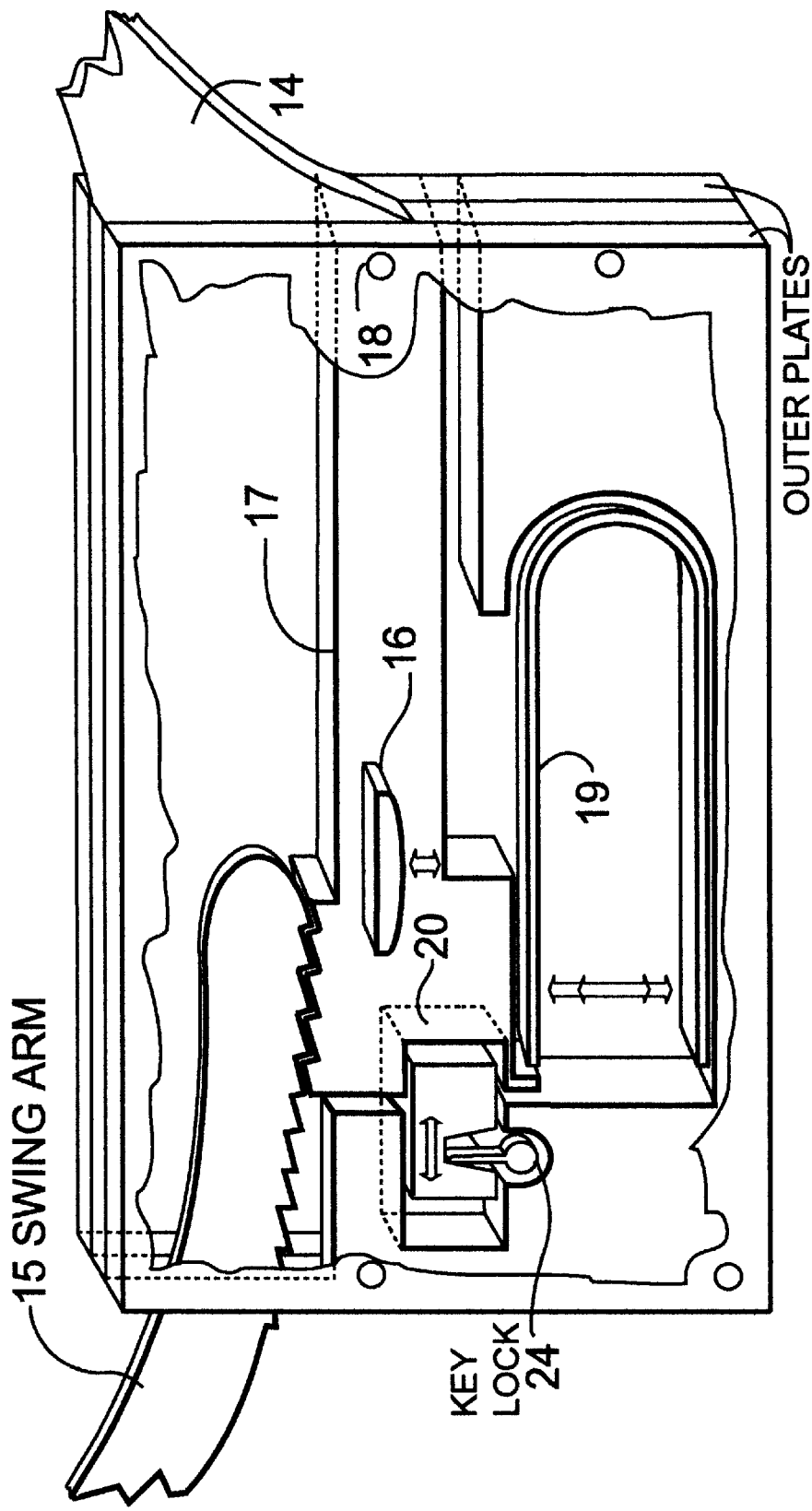

LOCKING GUN RACK SYSTEM

FIELD OF THE INVENTION

This invention relates to gun racks or gun support systems for securing guns in or on vehicles or for storage or display in a building (e.g., house, office, etc.). More particularly, this invention relates to locking gun racks to secure guns in a safe manner.

BACKGROUND OF THE INVENTION

Various types of gun racks have been previously used for supporting firearms in vehicles and in buildings such as homes and offices. Some of such gun racks have included locking mechanisms to deter theft or undesired removal of the firearms from the rack. See, for example, U.S. Pat. Nos. 3,618,785; 3,643,811; 3,767,093; 3,857,491; 4,596,334; 4,624,372; 5,022,534; 5,339,966; and 5,524,772.

However, some of the racks described in the foregoing patents are cumbersome to operate. Other of the racks in such patents are not adjustable. As a result, some types of guns may not be capable of being secured in certain of those racks. Also, prior racks which are not adjustable may not hold guns securely.

There has not heretofore been provided a locking gun rack system having the features and advantages provided by the present invention.

SUMMARY OF THE PRESENT INVENTION

In accordance with the present invention there is provided an improved locking gun rack system which is simple and effective for securing a gun to any desired structure (e.g., a wall in a house or office, in a vehicle, on an all-terrain vehicle, etc.)

The system of this invention is easy to operate and is very adjustable so that it is capable of accommodating a variety of firearms of different types, shapes and sizes.

In a preferred embodiment there is provided a locking gun rack system for detachably securing a gun to a desired support structure, the system comprising a pair of locking support means. Each of the locking gun support means comprises:

(a) base means including a stationary member defining a generally semi-circular face and a latch means;

(b) locking ring means pivotably attached to the base means and being pivotable between open and closed positions; the ring means including a plurality of detents spaced therealong; wherein the ring means is adapted to be latched in the base means at a plurality of positions by the latch means;

(c) release means for releasing the latch means.

Preferably the gun support means includes a locking means to prevent unauthorized removal of guns from the support means.

The gun rack system of this invention is able to be latched in a number of closed positions. Thus, the gun rack system can be used to secure a large variety of guns to any desired support structure.

Other advantages and features of the gun rack system of this invention will be apparent from the following detailed description and the accompanying drawings.

BRIEF DESCRIPTIONS OF THE DRAWINGS

The invention is described in more detail hereinafter with reference to the accompanying drawings, wherein like reference characters refer to the same parts throughout the several views and in which:

FIGS. 1–4 are perspective views showing different types of mountings for support means for mounting to a variety of different support structures;

FIGS. 5A, 5B, and 5C are side elevational views, partially cut away, of a preferred embodiment of a gun support means useful in this invention;

FIG. 6 is a perspective view of the gun support means shown in FIGS. 5A–5C; and

DETAILED DESCRIPTION OF THE INVENTION

Figure 1:
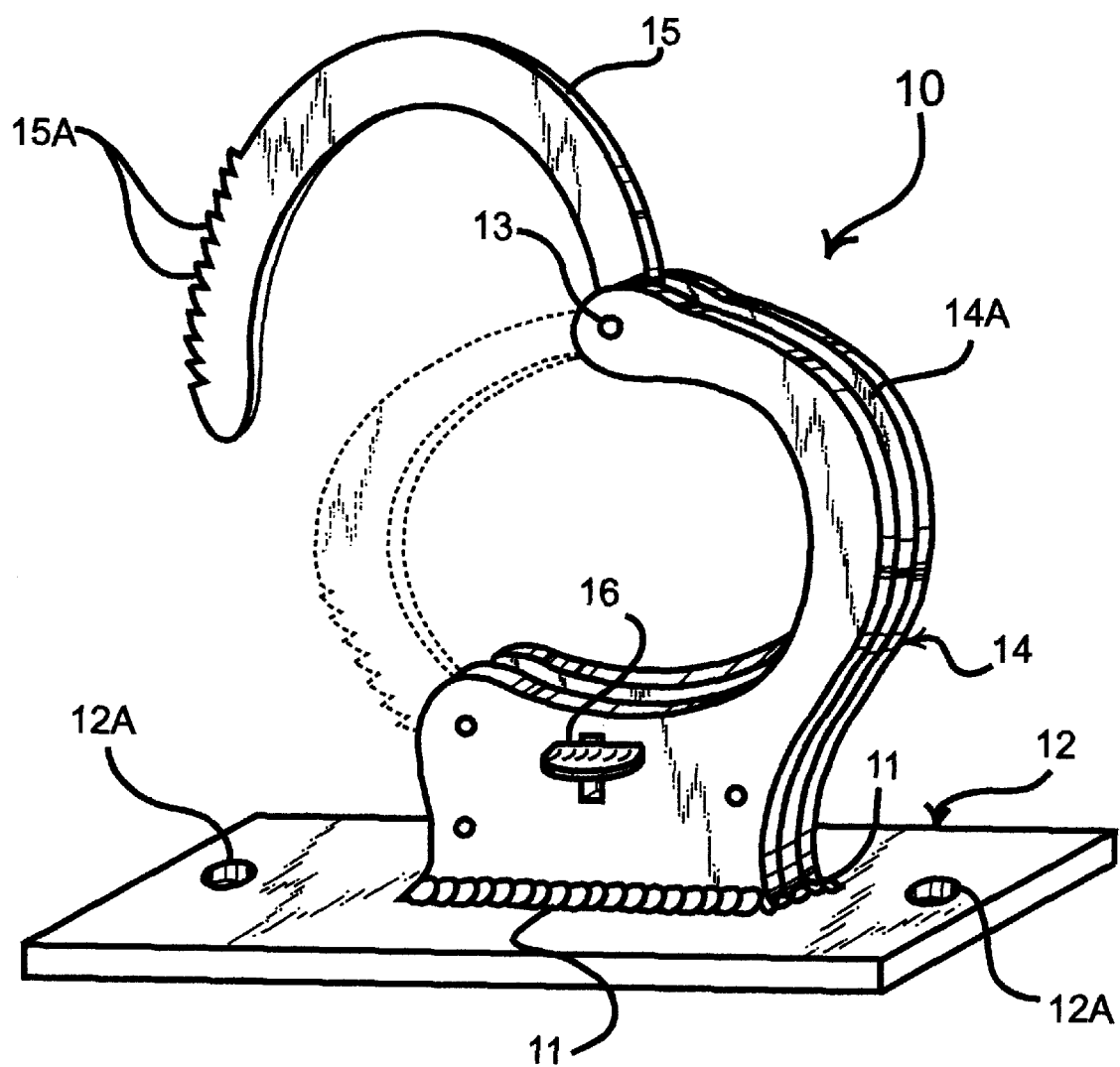

In FIGS. 1–4 there are shown different types of mountings for gun support means which are useful in the gun support system of this invention. In FIG. 1 there is shown a gun support means 10 comprising a base plate 12 and a locking device 14 secured to one face of the plate (e.g. by welds 11). The base plate includes apertures 12A to facilitate attachment of the plate to any desired flat surface (e.g. a wall) with screws or bolts.

Figure 5B:
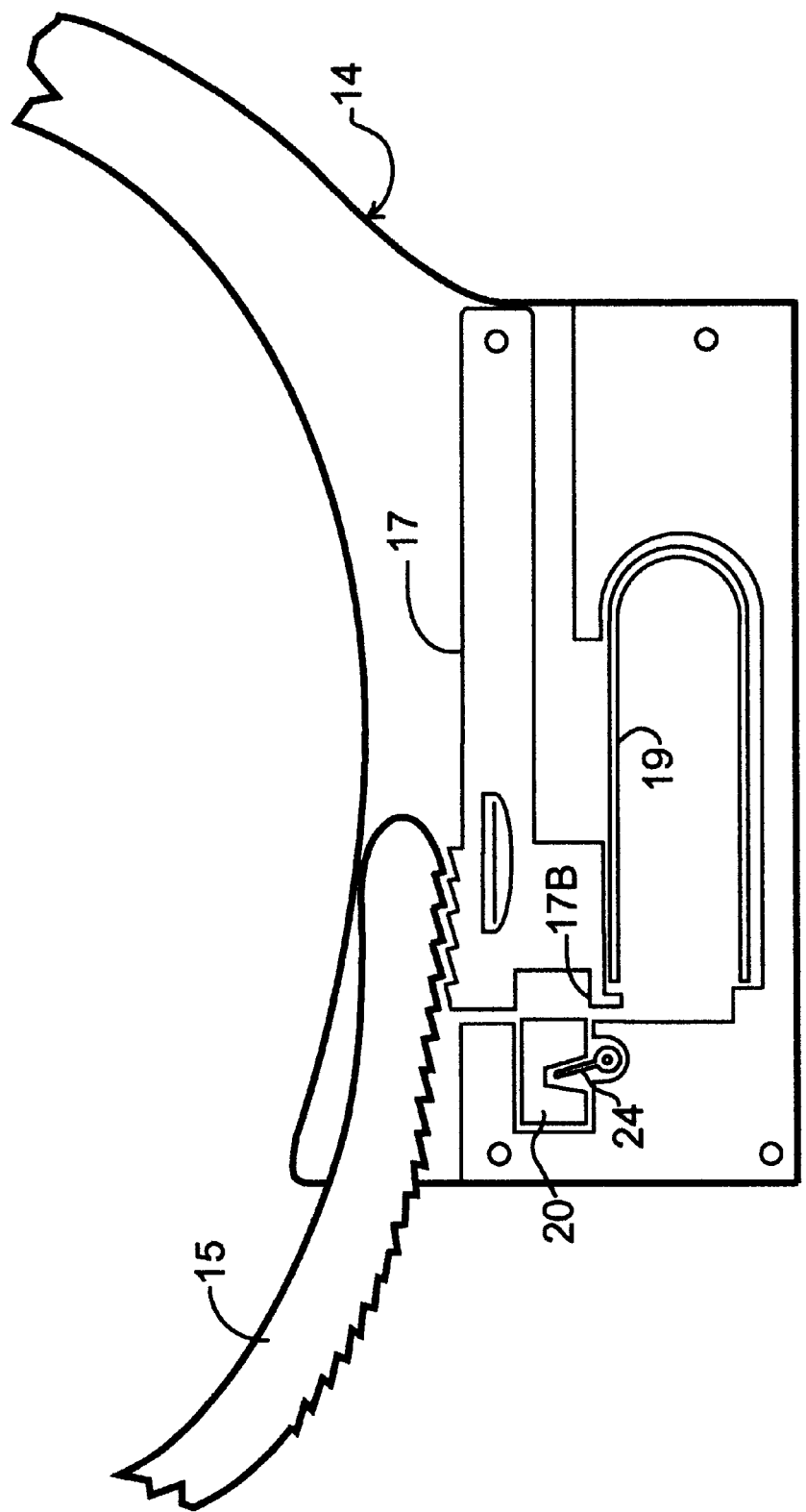

The locking device 14 comprises a lower end or base which is welded to the base plate 12 and it also includes a curved, fixed band portion 14A. To the outer end of band 14A there is pivotably attached a curved band arm or ting portion 15 which is pivotable about mounting pin 13 between open and closed positions. The outer or free end of arm 15 includes a plurality of spaced notches or teeth 15A. When the arm 15 is pivoted to its closed position, the outer end of the arm passes into the base of device 14 and is captured or latched by teeth or notches on a spring-biased latching plate (as shown in detail in FIGS. 5A–5C). Due to the number of spaced notches or teeth on arm 15, there are a plurality of different latching positions for arm 15 (each resulting in a different diameter of the ring formed by the arm 15 and band portion 14A). This feature thereby provides a significant degree of adjustability to the gun support means so as to accommodate different sizes and shapes of guns to be secured. In order to release arm 15 from its latched position, release lever 16 can be moved downwardly. This action is illustrated in FIG. 5A.

The size and thickness of plate 12 may vary, as desired. Also, the size of the locking device 14 may vary, as desired.

Figure 2:
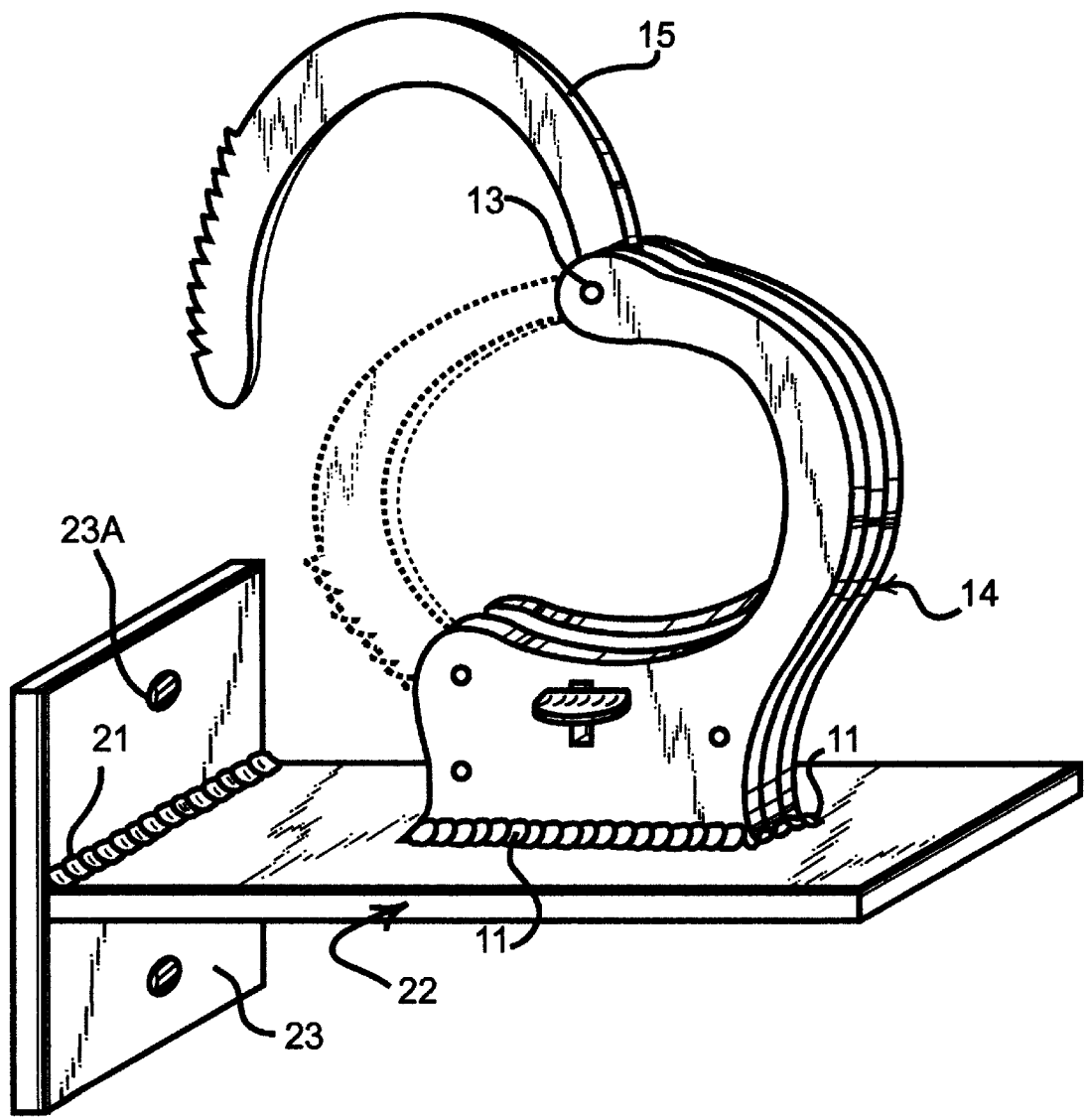

In FIG. 2 the locking device 14 is secured to a plate 22 which is attached at one end to perpendicular plate 23 (e.g. with welds 21). Plate 23 may include one or more apertures 23A to facilitate mounting of the gun support to any desired support structure.

Figure 3:
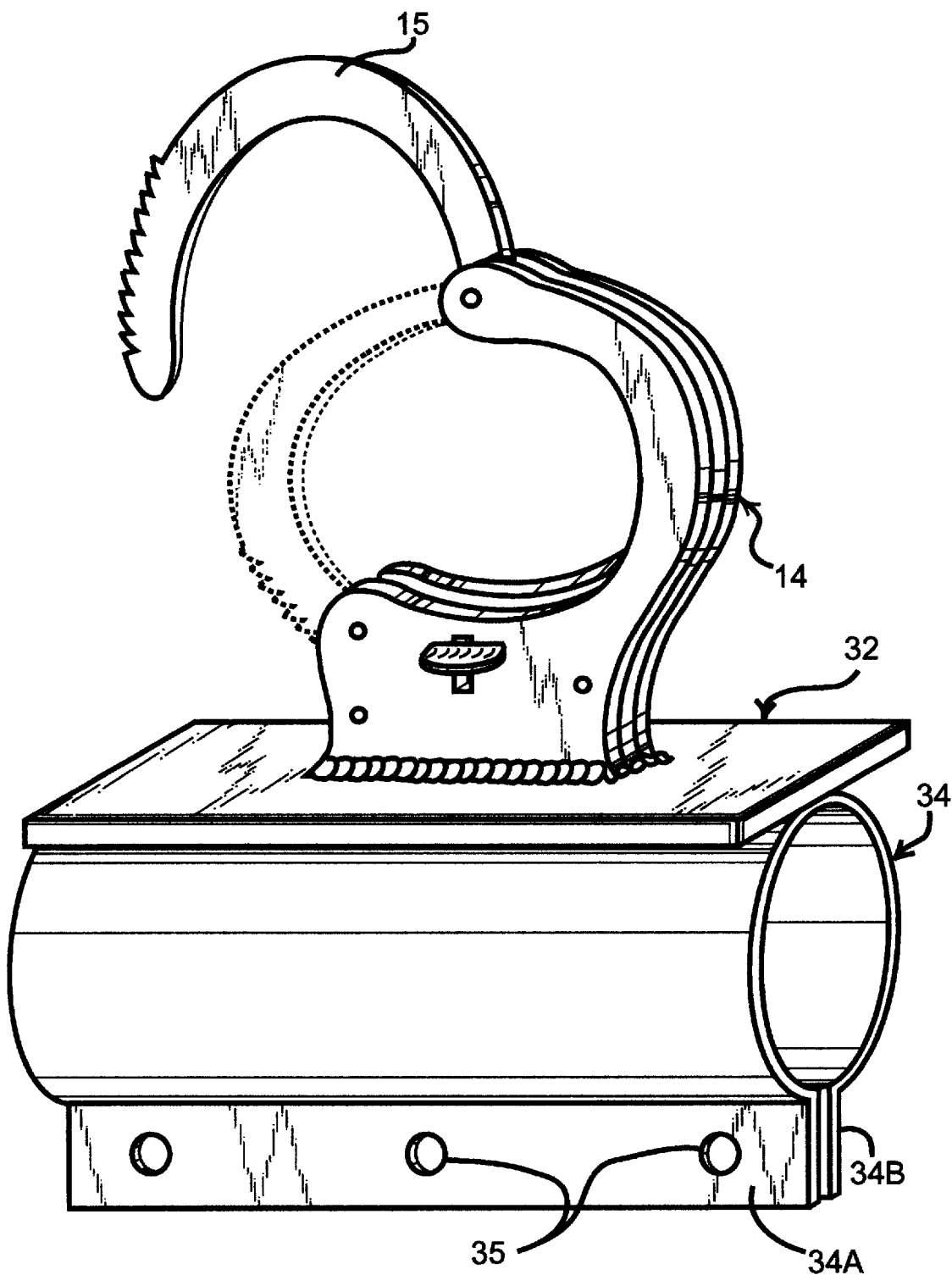
Figure 4:
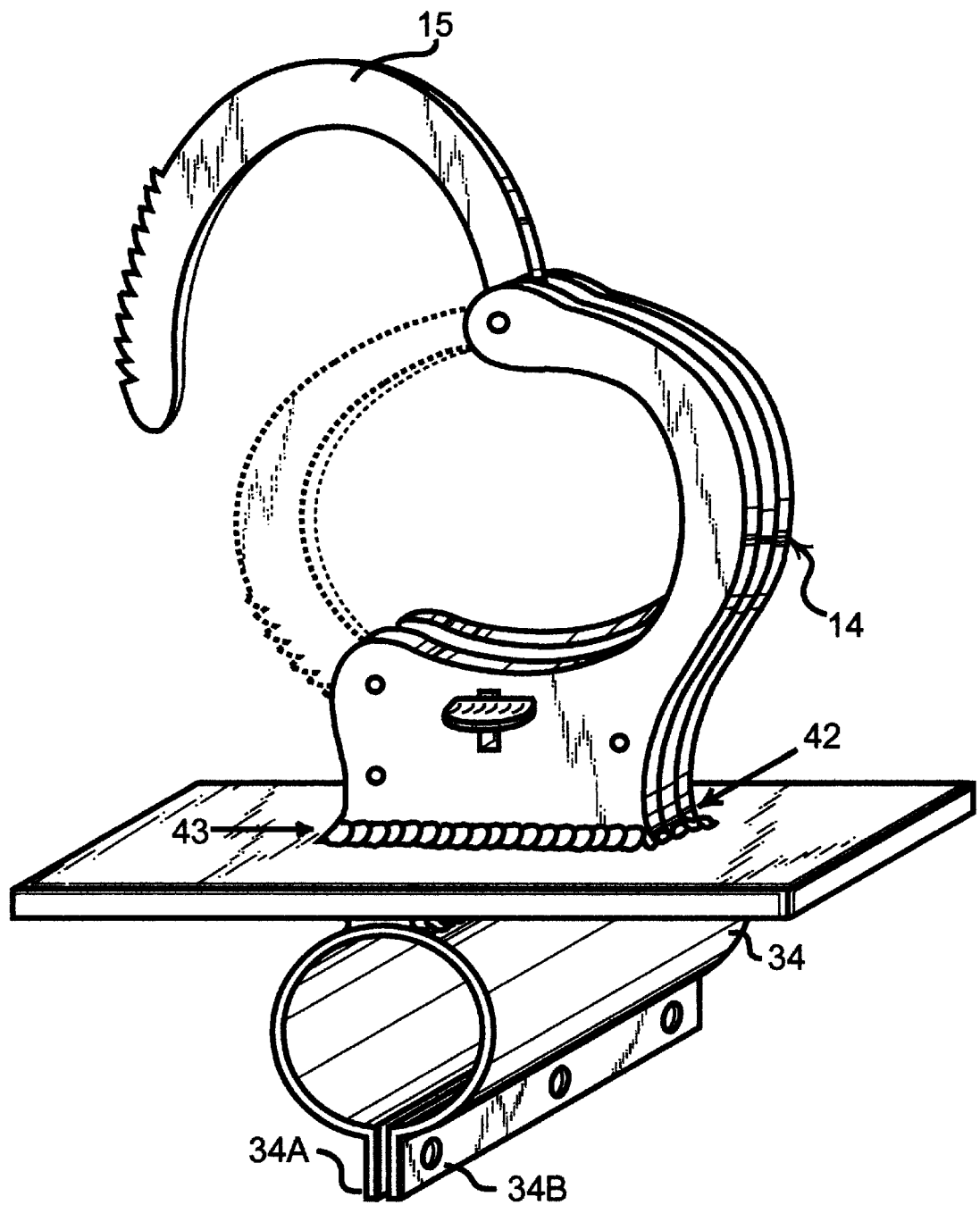

FIG. 3 shows the locking device secured to a plate 32 which in turn is secured (e.g. by welding) to a tubular clamp means 34 having opposing flanges 34A and 34B. Apertures 35 through the flanges accommodate bolts for tightening the clamp on a round support structure (e.g. handle bars, or a rack on an all-terrain vehicle, etc.). FIG. 4 shows the locking device secured to a plate 42 (e.g. with welds 43). The opposite face of the plate 42 is welded to a tubular clamp 34 which is oriented perpendicularly as compared to the orientation shown in FIG. 3.

The latching mechanism in the locking device of a preferred gun support means is illustrated in FIGS. 5A–5C and 6. When the free end of arm 15 is urged into a recess in the base of device 14, the teeth or notches or detents 15A normally are engaged by the teeth or notches 17A on latch arm 17. A spring 19 urges the latch arm 17 to an upward position where the teeth 17A are caused to engage the teeth 15A on arm 15. Arm 17 is pivotably mounted at one end to device 14 with pin 18. In order to release arm 15 from latch arm 17, the release button 16 secured to the side of arm 17 is urged downwardly against the force of the spring 19. Then arm 15 can be withdrawn from the base of device 14.

Figure 5C:
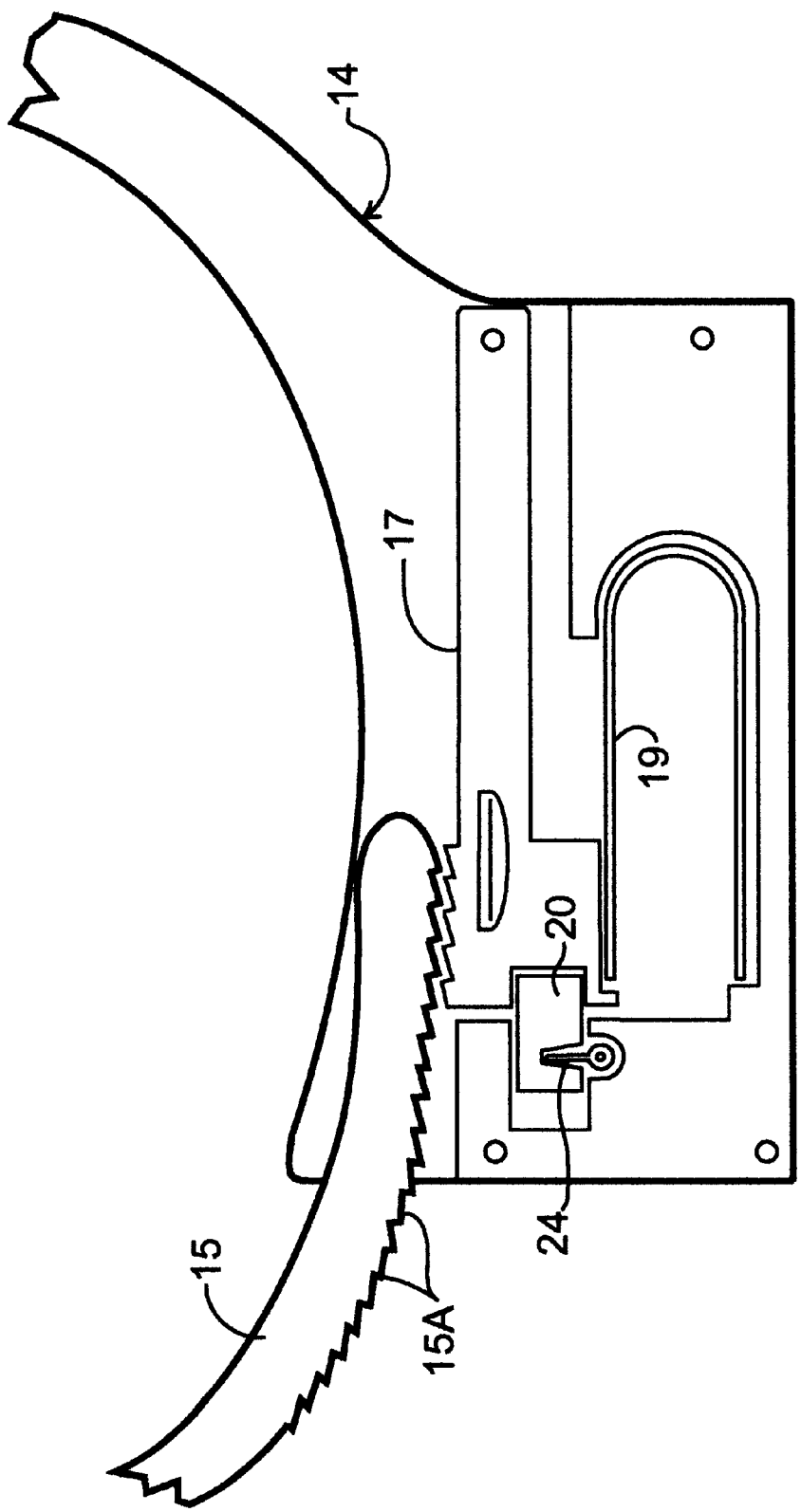

In order to lock the arm 15 in the base of device 14, the sliding lock 20 may be moved from its unlocked position (shown in FIG. 5C) by rotation of the lock tab 24 toward latch arm 17. The outer end of latch arm 17 includes a channel or recessed area 17B into which the lock 20 is slidably received in order to effectively lock the arm 15 in device 14. This locked position is shown in FIG. 5C. When the lock 20 is in the recess 17B, arm 17 is prevented from being depressed by button 16. Preferably, the lock can be operated only with an appropriate key so that a gun which has been secured in the gun supports cannot be removed by an unauthorized person.

FIG. 6 also illustrates the preferred latching and locking mechanism of the gun support means.

Figure 7:
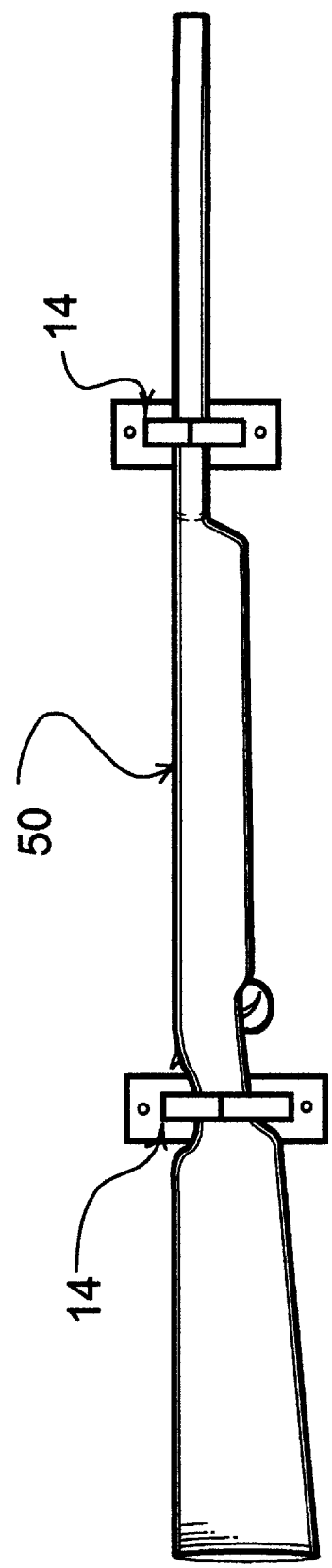
FIG. 7 is a front elevational view showing two gun support means of one embodiment of the invention being used to secure a gun to a wall.

FIG. 7 illustrates use of the locking gun supports 14 to secure a gun 50 to a support structure such as a wall or gun cabinet, for example. The other versions of the gun supports can be used to secure a gun to any other type of structure, such as a vehicle, tubular rail, wall, etc.

Other variants are possible without departing from the scope of this invention.

What is claimed is:

1. A locking gun rack system for detachably securing a gun to a desired support structure, said system comprising a pair of locking gun support means, wherein each gun support means comprises:

(a) a base including a stationary member defining a generally curved face, said base also including latch means; wherein said base further includes mounting means comprising a plate member secured to said stationary member; wherein said mounting means enables said stationary member to be secured to said support structure;

(b) locking ring means pivotably attached to said base and being pivotable between open and closed positions; said locking ring means including a plurality of detents spaced therealong; wherein said locking ring means is adapted to be latched in said base at a plurality of positions by said latch means; and (c) release means for releasing said latch means.

2. A system in accordance with claim 1, wherein said curved face of said base is semi-circular.

3. A system in accordance with claim 1, wherein said detents on said locking ring means comprise teeth.

4. A system in accordance with claim 1, further comprising lock means for locking said locking ring means in said closed position.

5. A locking gun rack system for detachably securing a gun to a support structure, the system comprising:

(a) a support structure;

(b) a pair of locking gun support means secured to said support structure; wherein each gun support means comprises:

(i) a base including a stationary member defining a generally-curved face, said base also including latch means;

(ii) locking ring means pivotably attached to said base and being pivotable between open and closed positions; said locking ring means including a plurality of detents spaced therealong; wherein said locking ring means is adapted to be latched in said base at a plurality of positions by said latch means; and (iii) release means for releasing said latch means.

6. A system in accordance with claim 5, further comprising lock means for locking said locking ring means in said closed position.

7. A system in accordance with claim 5, wherein said base includes mounting means comprising a plate member secured to said stationary member.

8. A system in accordance with claim 7, wherein said plate member includes apertures therethrough.

* * * * *